Oct. 8, 1968  F. R. MORTIMER  3,404,758
VEHICLE ANTI-SKID BRAKING SYSTEM
Original Filed May 11, 1965  3 Sheets-Sheet 1
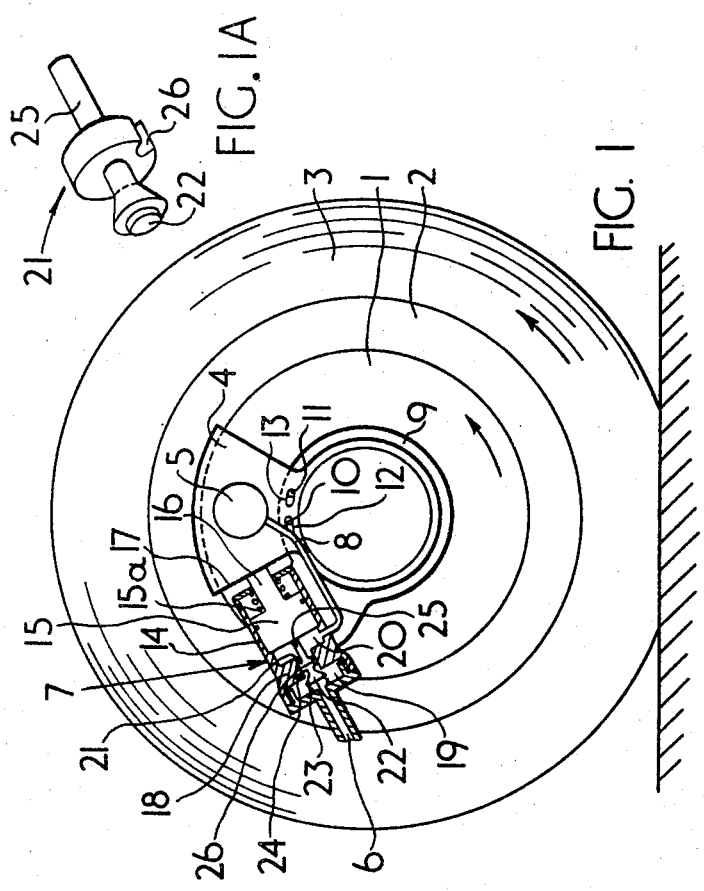

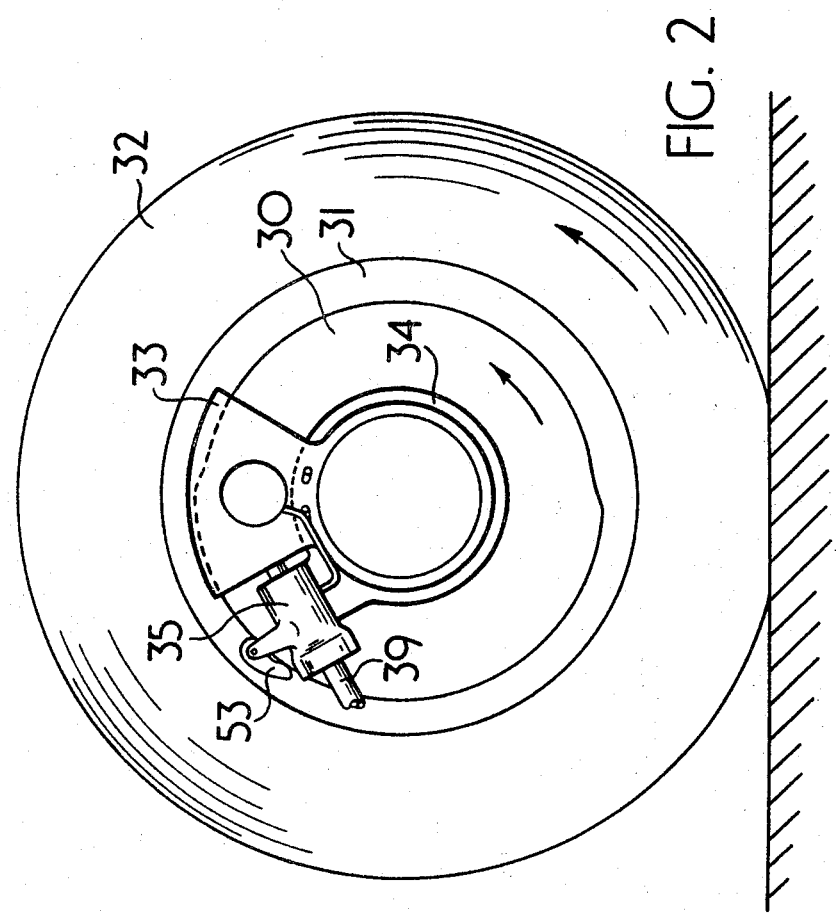

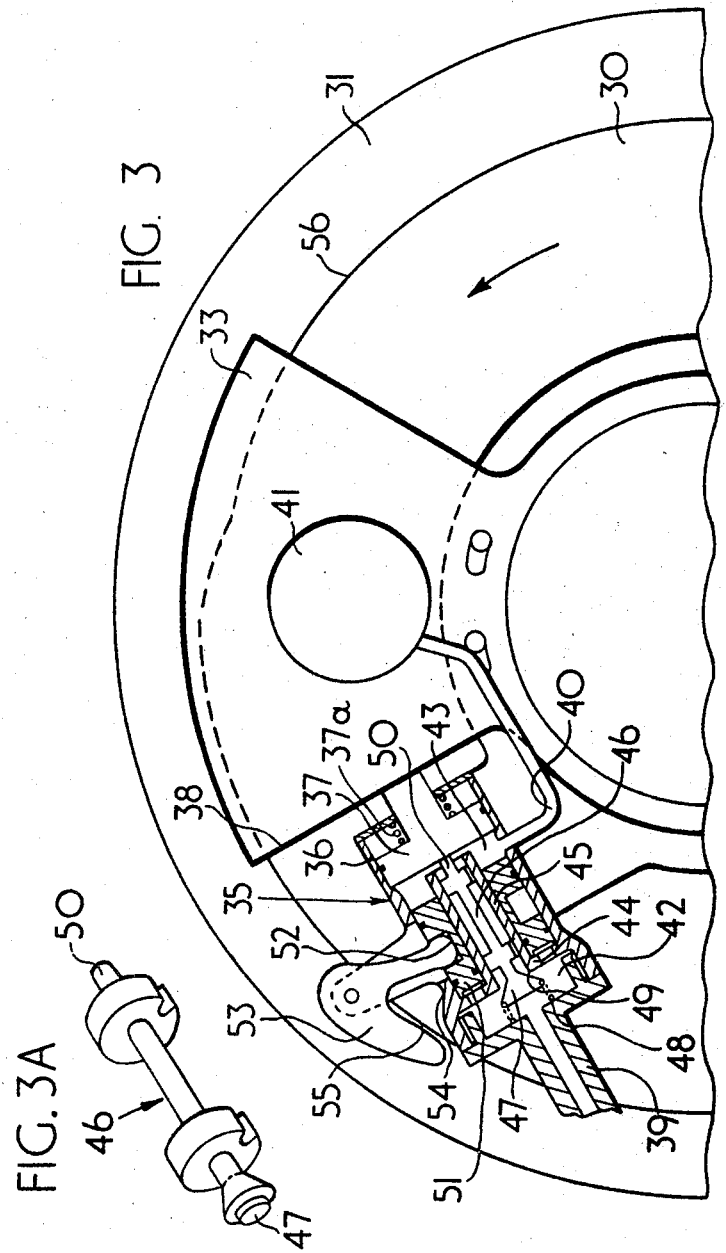

United States Patent Office 3,404,758
Patented Oct. 8, 1968

3,404,758
VEHICLE ANTI-SKID BRAKING SYSTEM
Frank R. Mortimer, Styvechale, England, assignor to The Dunlop Company Limited, London, England, a corporation of Great Britain
Continuation of application Ser. No. 454,782, May 11, 1965. This application Sept. 1, 1967, Ser. No. 674,956
Claims priority, application Great Britain, May 13, 1964, 19,832/64; Jan. 11, 1965, 1,097/65
14 Claims. (Cl. 188—181)

ABSTRACT OF THE DISCLOSURE

The present invention comprises a fluid pressure operated brake having a friction member which is movable within angularly spaced limitations, as a torque reaction from the force exerted by the friction member on the rotor during braking. The limited angular movement is opposed by a thrust device which is fluid pressure operated and has an operative fluid pressure connection with a brake actuator which applies said friction member. A valve is provided to control the supply of fluid to the brakes and interrupts the supply of fluid when the thrust of the thrust device exceeds the torque reaction force, this being the condition which occurs during a wheel slip. When the wheel slip terminates, and the wheel spins up then the torque reaction can increase and then oppose the thrust of the thrust device when the valve is again operated to restore the supply of fluid to the brake actuator.

---

The present invention relates to a vehicle anti-skid braking system, and to a brake for such a system, and this application is a continuation in whole of application Ser. No. 454,782, filed May 11, 1965, for "Vehicle Anti-Skid Braking System."

When braking pressure is applied to the brakes of a moving vehicle having pneumatic tires the braking torque produced on each wheel increases with increasing braking pressure up to a maximum value which corresponds to the maximum torque that the tire-to-ground coefficient of friction can develop. If the braking pressure applied is in excess of this predetermined value then the tire contact area will begin to slide or skid relative to the ground and the wheel will rapidly lose speed until the point is reached when it locks, and stops rotating.

The object of the present invention is to provide means for reducing the tendency for the vehicle wheels to skid.

According to the present invention a brake comprises a rotatable member, a friction member engageable with the rotatable member and capable of limited movement about the axis thereof, a fluid-pressure operated brake-applying mechanism for forcing the friction member into engagement with the rotatable member, and control means for controlling the pressure of fluid in the brake-applying mechanism, the control means comprising a fluid pressure operated thrust device mounted on a nonrotatable support adjacent the friction member and arranged to be supplied with fluid at the same pressure as that in the brake-applying mechanism and to generate a thrust resistance to oppose the drag force or torque reaction exerted on the friction member by the rotatable member during braking in the normal forward direction of motion of the associated vehicle, and a valve for controlling the supply of fluid to the brake-applying mechanism, the valve being operatively associated with the thrust device and arranged to interrupt or reduce the supply of fluid pressure to the brake-applying mechanism when the said thrust exceeds the torque reaction developed from braking.

The torque reaction which is set up when the friction member of a brake is pressed into engagement with the rotatable member to be braked tends to move the friction member and its supporting structure around with the rotation of the braked member. This torque reaction is proportional to the braking torque produced, and it therefore follows that the torque reaction will increase proportionately with the braking pressure applied up to the point where the braking torque reaches its maximum value for the existing tire-to-ground friction coefficient. When this point is reached the torque reaction will stabilize at a constant value or begin to fall slightly as the tire begins to slide. The brake defined in the preceding paragraph uses this effect to provide means for preventing the tire from sliding.

In a preferred form of brake in accordance with the invention, a disc brake comprises a rotatable disc, a pair of friction members engageable with opposite sides of the disc and capable of limited angular movement about the axis of rotation thereof, a fluid pressure operated brake-applying mechanism for forcing the friction members into engagement with the disc, and control means for controlling the pressure of fluid in the brake-applying mechanism, the control means comprising a fluid pressure operated thrust device mounted on a nonrotatable support adjacent the friction members and arranged to be supplied with fluid at the same pressure as that in the brake-applying mechanism and to generate a thrust to oppose the torque reaction exerted on at least one of the friction members by the disc during braking in the normal forward direction of motion of the associated vehicle, and a valve for controlling the supply of fluid to the brake-applying mechanism, the valve being operatively associated with the thrust device and arranged to interrupt or reduce the supply of fluid pressure to the brake-applying mechanism when the said thrust exceeds the torque reaction.

Preferably also, an auxiliary piston is arranged to be subjected at one side to the pressure of the fluid in the brake-applying mechanism and at the other side to the pressure of fluid supplied to the control means, and means is provided to cause an oscillatory movement of the auxiliary piston upon closure of the valve, the arrangement being such that the oscillatory movement of the auxiliary piston causes oscillatory changes of pressure in the fluid in the brake-applying mechanism.

According to the invention also, a vehicle braking system comprises a rotatable member, a friction member engageable with the rotatable member and capable of limited movement about the axis of rotation thereof, a source of fluid pressure, a fluid-pressure operated brake-applying mechanism for forcing the friction member into engagement with the rotatable member, and control means for controlling the pressure of fluid in the brake-applying mechanism, the control means comprising a fluid-pressure operated thrust device mounted on a nonrotable support adjacent the friction member and arranged to be supplied with fluid at the same pressure as that in the brake-applying mechanism and to generate a thrust to oppose the torque reactoin exerted on the friction member during braking in the normal forward direction of motion of the associated vehicle, and a valve for controlling the supply of fluid to the brake-applying mechanism, the valve being operatively associated with the thrust device and arranged to interrupt the supply of fluid pressure from the source thereof to the brake-applying mechanism when the said thrust exceeds the torque reaction.

Two embodiments of the present invention will now be described with reference to the accompanying drawings, in which:

FIGURE 1 is a diagrammatic axial view, partly in cross-section, showing a vehicle wheel and a disc brake associated with the wheel;

FIGURE 1A is an isometric detail view of a conical headed valve used in the disc brake of FIGURE 1;

FIGURE 2 is a diagrammatic axial view of a vehicle wheel and disc brake, showing an alternative embodiment of the invention;

FIGURE 3 is a diagrammatic axial view, partly in cross-section, showing the embodiment of FIGURE 2 in greater detail; and FIGURE 3A is an isometric detail view of a conical headed valve used in the embodiment of FIGURE 3.

The disc brake shown in FIGURE 1 comprises an annular disc 1, secured at its inner periphery to the hub of a wheel 2 fitted with a pneumatic tire 3, and rotatable with the wheel. A caliper-type housing 4 has a pair of limbs straddling the outer periphery of the disc 1 and each containing an axially slidable friction pad (not shown), the pads being movable into engagement with the disc by a brake operating mechanism 5 in the form of a pair of hydraulically-operated cylinders and pistons secured one to each limb of the caliper and supplied with fluid from a conventional driver-operated master cylinder (not shown) through a connection 6, control apparatus 7 and a pipe 8. The housing 4 is secured to a nonrotable part 9 of the vehicle in such a manner that it is permitted a limited amount of angular movement relative thereto, the movement of the housing 4 being limited by a pair of pins 10, 11 fixed to the nonrotable part 9 and received though and bottoming at the ends of arcuate slots 12 and 13 in the housing.

The control apparatus 7 is mounted on the nonrotable part 9 adjacent the caliper-type housing 4. The control apparatus incorporates a thrust device comprising a cylinder 14 having a control piston 15 slidable therein and having a member 16 arranged to contact the edge 17 of the caliper, which is the trailing edge relative to the direction of rotation of the disc as shown by the arrow, to support the caliper against the torque reaction exerted thereon by the rotating disc through the friction pad as the pad engages the disc 1. The cylinder 14 is interposed in the fluid supply line to the brake operating mechanism 5, and therefore normally contains fluid at a pressure equal to that in the operating mechanism. The diameter of the cylinder 14 and piston 15 is selected to provide sufficient force to balance the torque reaction exerted on the caliper-type housing 4 by the disc during normal operation, and a coil spring 15a located on the member 16 is provided to urge the piston 15 to the position shown in FIGURE 1 when the brake is not in operation.

The cylinder 14 of the control apparatus is divided into two chambers separated by an annular flange 18: a supply chamber 19 connected to the driver's master cylinder, and a control chamber 20 connected to the brake operating mechanism. A conical-headed valve 21 is disposed within the tube with its head 22 in the supply chamber 19 and spring-loaded by a spring 23 into engagement with a valve seat formed in an opening 24 in the flange 18, and its stem 25 passing through the opening to a point where it is engageable by the control piston 15. The arrangement of the valve is such that the control piston holds the valve open to permit free communication between the driver's master cylinder and the brake operating mechanism 5 during normal operation of the brake, but movement of the control piston outwardly (in a direction opposing the torque reaction developed by the housing 4) along its cylinder 14 by more than a predetermined amount will enable the valve to close. When the valve is open fluid can pass from the supply chamber to the control chamber through grooves 26.

The operation of the control valve is as follows:

With the brakes released the piston 15 is urged by the spring 15a to the position shown in FIGURE 1 in which the piston is held in engagement with the stem 25 of the valve 21 to maintain it in the open position and thereby permit direct communication between the source of fluid pressure and the cylinders of the brake operating mechanism 5.

Fluid pressure is supplied from the driver's master cylinder to the mechanism 5 via the supply chamber 19, the groove 26 and the control chamber 20. When the friction members come into contact with the disc the torque reaction will tend to move the housing 4 with the disc up to the limit of its permitted movement. This movement of the housing is opposed by the supply pressure acting on the control piston 15 which is designed to apply an equal and opposite reaction force to the housing, provided that the torque reaction does not reach its maximum value.

This arrangement is made possible because the torque reaction exerted on the housing by the rotating disc when the brake is applied is proportional to the braking pressure applied, provided that the tire does not slide on the ground and thus allow the braking torque to decrease. The torque reaction can therefore increase up to a maximum value corresponding to the maximum braking torque that the tire-to-ground coefficient of friction can withstand without skidding of the tire contact area taking place.

The only variables that affect the calculation of the drag forces for a given brake are the braking pressure applied and the coefficient of friction of the friction material, assuming that the disc is rotating. Of these two variables the coefficient of friction of the friction material can be standardised for the life of the brake and since the braking pressure applied to the brake operating mechanism is the same as the pressure applied to the control piston it will be seen that by using a control piston of the appropriate diameter it is possible to counteract the torque reaction exerted on the housing and thereby maintain the housing in a stationary position, provided that the braking torque does not reach its maximum permissible value above which sliding of the wheel being braked would take place.

If the braking pressure applied is too severe for the tire-to-ground coefficient of friction then the tire contact area will begin to slide relative to the ground, thus causing the torque reaction forces to cease to remain in proportion to the braking pressure applied. As a result of this, the thrust exerted by the control piston will exceed the torque reaction forces generated and the housing 4 will be urged in a direction opposite to the direction of rotation of the disc.

This movement of the caliper and control piston permits the spring 23 to close valve 21 and thereby prevent communication between the source of fluid pressure and the cylinders of the operating device 5. This movement of the control piston will also increase the volume of the control chamber 20 and thereby cause a corresponding reduction in the pressure therein. Since the control chamber and the cylinders of the brake operating mechanism 5 are in communication a reduction of pressure in the control chamber causes a corresponding reduction of the pressure in the cylinders of the operating mechanism 5. This reduction in the brake-applying pressure will continue until the torque reaction forces and the control pressure counterbalance each other, the balance point being reached when the braking pressure has been reduced to a level at which the resulting braking torque can be supported by the available tire-to-ground coefficient of friction.

The control means described above will be equally effective if during normal braking on a dry surface, having a high tire-to-ground coefficient of friction, the tire contact area strikes a wet or icy patch with a reduced tire-to-ground coefficient of friction. The operation of the control device will be substantially as previously described because the control piston thrust will exceed the torque reaction forces as soon as the tire begins to slide.

FIGURES 2 and 3 show an alternative embodiment of the invention.

The brake shown in FIGURES 2 and 3 comprises an annular disc 30 secured at its inner periphery to the hub of a wheel 31 having a pneumatic tire 32, and rotatable with the wheel. A caliper-type housing 33 of the kind shown in FIGURE 1 and described above is secured to a non-rotatable part 34 of the vehicle, as in the previous embodiment, in such a manner that it is permitted a limited amount of angular movement relative thereto.

A control apparatus 35 is mounted on the nonrotatable part 34 of the vehicle adjacent the caliper-type housing 33. The control apparatus 35 comprises a cylinder 36 having a control piston 37 slidable therein and arranged to contact the trailing edge 38 of the housing 33 to support the housing against the torque reaction exerted thereon by the rotating disc. The piston 37 is urged to the left (FIGURE 3) by a coil spring 37a located within the cylinder 36. The cylinder 36 is interposed in the fluid supply lines 39 and 40 from the driver's mastercylinder (not shown) to the brake operating mechanism 41, and therefore normally contains fluid at a pressure equal to that in the operating mechanism. The diameter of the piston 37 is selected to provide sufficient force to balance the troque reaction exerted on the caliper-type housing by the disc during normal operation.

The cylinder 36 of the control apparatus 35 is divided into two chambers 42 and 43 separated by an annular flange 44: the supply chamber 42 is connected to the driver's master cylinder, and the control chamber 43 is connected to the brake operating mechanism 41. An open-ended tube 45 is located coaxially in the control chamber 43 and is fluid-tightly secured at its edge at one end to the flange. A conical-headed valve 46 is disposed within the tube with its head 47 in the supply chamber and spring-loaded by a spring 48 into engagement with a valve seat 49 formed in the opening to the tube from the supply chamber, and its stem 50 passing through the tube to a point where it is engageable by the control piston. The arrangement of the valve 46 is such that the control piston 37 which is acted upon by a coil spring 37a holds the valve 46 open to permit free communication between the driver's master cylinder and the brake operating mechanism 41 during normal operation of the brake, but movement of the control piston outwardly from its cylinder in a direction opposite that of the rotation of the disc by more than a predetermined amount will enable the spring 48 to close the valve 46.

An annular auxiliary piston 51 is fluid-tightly slidable in engagement with the outer surface of the tube 45 and the inner surface of a reduced-diameter portion of the cylinder 36, and is subjected on one side to the pressure of fluid in the supply chamber and on the other side to the pressure of fluid in the control chamber, the flange 44 being drilled to permit communication between the supply chamber and the annular space between the tube 45 and the cylinder wall.

A circumferential groove 52 is formed mid-way between the ends of the auxiliary piston and is engaged by one end of a bell-crank lever 53 pivotally mounted on the cylinder, an axial slot 54 being formed along part of the length of the cylinder wall to enable the end of the lever 53 to pass through and engage the auxiliary piston. The other end of the bell-crank lever carries a cam follower 55 which is arranged to contact a cam surface 56, formed on the outer edge of the brake disc 30, when the auxiliary piston moves beyond a predetermined distance towards the end of the cylinder adjacent the caliper-type housing.

The operation of the system described above is as follows.

Assuming that the vehicle is moving on a road surface having a low coefficient of friction, when the brake is applied the control valve will remain open, allowing the brake to be operated, until the pressure in the brake operating mechanism nears a value sufficient to cause locking of the wheel. Until this stage is reached the pressures in the supply chamber and the control chamber are equal, and the auxiliary piston does not move; the control piston is subjected to the same pressure as that developed in the brake operating mechanism, but the thrust developed is insufficient to overcome the torque reaction force exerted on the brake housing by the rotating disc, and the control piston therefore does not move from the position shown in FIGURE 3.

When the wheel begins to lock the torque reaction force exerted on the brake housing by the disc decreases, as the friction between the associated tire and the road surface changes from static friction to sliding friction and is thus reduced in value. If the brake operating pressure is not released by the driver the pressure applied to the control piston then becomes sufficient to overcome the reduced drag force and the piston moves outwardly in its cylinder to move the brake housing in a direction opposite to the direction of rotation of the wheel.

Movement of the control piston beyond a predetermined distance permits the spring 48 to cause the control valve 46 to close, and the control chamber 43 is then isolated from the supply chamber 42. Further movement of the control piston then reduces the pressure in the control chamber and brake operating mechanism causing the brake to be released.

The reduction of pressure in the control chamber 43 also causes a tendency for the auxiliary piston 51 to be moved towards the end of the cylinder adjacent the brake. This movement of the auxiliary piston is checked when the cam follower 55 on the bell-crank lever 53 contacts the cam surface 56 formed on the outer edge of the brake disc, and the auxiliary piston 51 is then moved by the bell-crank lever in an oscillatory manner as the wheel rotates. This causes oscillations in pressure within the control chamber which cause the brake to be successively applied and released, and serves to provide an improved braking effect compared with that which is obtained when the wheel is merely allowed to accelerate to a true rolling speed before the brake is re-applied.

It will be noted that the fluctuations in the pressure applied to the brake operating mechanism will take place over a range of values approximating to the value at which the wheel has commenced to skid, and this will provide a more effective braking response than would be obtained if the brake pressure were allowed to oscillate between zero and maximum values.

The oscillatory movement of the auxiliary piston also causes an oscillation in the pressure in the supply chamber 42, and this oscillation is transmitted back to the driver's master cylinder, causing a vibration of the brake operating pedal which can be felt by the driver and which warns him that too much braking pressure has been applied. The driver can then reduce the pressure applied to the brake to a level at which skidding does not occur.

When the wheel again grips the road and normal braking becomes possible the torque reaction exerted on the housing 33 again balances, or slightly exceeds, the thrust from the control piston and moves the control piston back into its cylinder, opening the control valve 46 to restore normal braking.

The braking system in accordance with the invention is an effective skid control system which can be easily incorporated in an otherwise standard brake system. It does not require power assistance and its mode of operation takes into account the braking effects produced by the vehicle's engine and power transmission gear. The system is sufficiently simple and cheap to enable each brake to be independently controlled, and there are no moving parts during normal operation of the brake. Al-

I claim:

1. In a brake having a rotatable member and a friction member engageable with the rotatable member and capable of limited movement about the axis thereof, the structure comprising a fluid pressure operated brake-applying mechanism for forcing the friction member into engagement with the rotatable member, and control means for controlling the pressure of fluid in the brake-applying mechanism, the control means comprising a fluid pressure operated thrust device having a control member operatively combined with said friction member, a control chamber, said control member being located in fluid tight engagement within said control chamber, means for supplying fluid under pressure to said control chamber to effect movement of said control member relatively to the control chamber and thereby to generate a thrust in opposition to movement of said friction member under the action of the drag force produced by its engagement with said rotatable member during braking in a normal direction of motion of said rotatable member, said control chamber having a continuous direct fluid pressure connection with said brake-applying mechanism whereby the fluid pressure in the thrust device and brake applying mechanism respectively are equal during the entire braking operation, and a valve for controlling the supply of fluid to the brake-applying mechanism, the valve being operatively associated with the thrust device and arranged to interrupt or reduce the supply of fluid pressure to the brake-applying mechanism when the said thrust exceeds the torque reaction.

2. In a disc brake having a rotatable disc, and a pair of friction members engageable with opposite sides of the disc and capable of limited movement about the axis of rotation thereof, the structure comprising a fluid pressure operated brake-applying mechanism for forcing the friction members into engagement with the disc, and control means for controlling the pressure of fluid in the brake-applying mechanism, said control means comprising a fluid pressure operated thrust device having a control member operatively combined with said friction members, a control chamber, said control member being located in fluid tight engagement within said control chamber, means for supplying fluid pressure to said control chamber to effect movement of said control member relatively to the control chamber and thereby to generate a thrust in opposition to movement of said friction members under the action of said drag force produced by engagement with said rotatable member during braking in a normal direction of motion of said rotatable member, said control chamber having a continuous direct fluid pressure connection with said brake-applying mechanism whereby the fluid pressures in the thrust device and brake-applying mechanism respectively are equal during the entire braking operation, and a valve for controlling the supply of fluid to the brake-applying mechanism, said valve being operatively associated with the thrust device and arranged to control the supply of fluid pressure to the brake-applying mechanism as the said thrust exceeds the torque reaction force.

3. A vehicle braking system comprising a rotatable member, a friction member engageable with the rotatable member and capable of limited movement about the axis of rotation thereof, a source of fluid pressure, a fluid pressure operated brake-applying mechanism for forcing the friction member into engagement with said rotatable member, and control means for controlling the pressure of fluid in said brake-applying mechanism, said control means comprising a pressure operated thrust device having a control member operatively combined with said friction member, a control chamber, said control member being located in fluid tight engagement within said control chamber, means for supplying fluid under pressure to said control chamber to effect movement of said control member relatively to the control chamber and thereby to generate a thrust in opposition to movement of said friction member under the action of the drag force produced by its engagement with said rotatable member during braking in a normal direction of motion of said rotatable member, said control chamber having a continuous direct fluid pressure connection with said brake-applying mechanism whereby the fluid pressures in the thrust device and brake-applying mechanism respectively are equal during the entire braking operation, and a valve for controlling the supply of fluid to the brake-applying mechanism, the valve being operatively associated with the thrust device and arranged to control the supply of fluid pressure to the brake-applying mechanism as the said thrust exceeds the torque reaction.

4. A disc brake according to claim 2 wherein said control member is in the form of a control piston and said control chamber is arranged to be connected through said valve to a supply chamber having a source of fluid pressure.

5. In a disc brake having a rotatable disc, and a pair of friction members engageable with opposite sides of the disc and capable of limited movement about the axis of rotation thereof, the structure comprising a fluid pressure operated brake-applying mechanism for forcing the friction members into engagement with the disc, and control means for controlling the pressure of fluid in the brake-applying mechanism, said control means comprising a fluid pressure operated thrust device, a control member operatively associated with at least one of said friction members, a control chamber fluid tightly receiving said control member, said control chamber communicating with the brake-applying mechanism so that the fluid pressures in the thrust device and in the brake-applying mechanism are equal, said thrust device being arranged to oppose movement of at least one of the friction members under the torque reaction force exerted on the friction members by the rotatable disc during braking in the normal forward direction of motion of the associated vehicle, and a valve for controlling the supply of fluid to the brake-applying mechanism, said valve being operatively associated with the thrust device and arranged to control the supply of fluid pressure to the brake-applying mechanism as the said thrust exceeds the torque reaction force, said control member being in the form of a control piston disposed within said control chamber and arranged to regulate said valve which controls communication between said supply chamber having a source of fluid pressure and said control chamber, said control piston being provided with a member which operatively engages said friction member and is movable thereby.

6. In a brake having a rotatable member and a friction member engageable with the rotatable member and capable of limited movement about the axis thereof, the structure comprising a fluid pressure operated brake-applying mechanism for forcing the friction member into engagement with the rotatable member, and control means for controlling the pressure of fluid in the brake-applying mechanism, the control means comprising a fluid pressure operated thrust device having a control member operatively associated with the friction member, a control chamber, said control member being fluid tightly located in said control chamber which communicates with the brake-applying mechanism so that the fluid pressure in the thrust device and in the brake-applying mechanism are equal, said thrust device being arranged to oppose movement of the friction member under the torque reaction exerted on the friction member by the rotatable member during braking in the normal forward direction of motion of the associated vehicle, and a valve for controlling the supply of fluid to the brake-applying mechanism, the valve being operatively associated with the thrust device and arranged to interrupt or reduce the supply of fluid pressure to the brake-applying mechanism when the said thrust exceeds the torque reaction and including an auxiliary piston, arranged to be subjected at one side to the pressure of the fluid in the brake-applying mechanism and at the other side to the pressure of fluid supplied to the control member, and means provided to cause an oscillatory movement of the auxiliary piston upon closure of the valve, the arrangement being such that the oscillatory movement of the auxiliary piston causes oscillatory changes of pressure in the fluid in the brake-applying mechanism.

7. A disc brake according to claim 2 wherein the friction members are axially movably supported by a caliper-type housing, the housing being mounted on the nonrotatable support so as to be capable of a limited amount of angular movement about the axis of the disc and the thrust device being arranged to opposed movement of the housing resulting from the drag force exerted on the friction members during braking in the normal forward direction of motion of the associated vehicle.

8. A disc brake according to claim 7 wherein the thrust device comprises a control piston operatively associated with the friction member and fluid tightly slidable in a control chamber communicating with the brake-applying mechanism, the control chamber being connected through the said valve to a supply chamber which is arranged to be connected to a source of fluid pressure.

9. A disc brake according to claim 4 wherein the valve is spring-loaded to a position in which it interrupts the supply of fluid pressure to the brake-applying mechanism and has a stem engageable by the control piston to open the valve.

10. A brake according to claim 6 wherein the thrust device comprises a control position associated with a friction member and slidable in a cylinder, the control piston being subjected to the pressure of the fluid supplied to the brake-applying mechanism and being arranged to oppose the drag force exerted on the friction member by the rotatable member during braking in the normal forward direction of motion of the associated vehicle, the auxiliary piston also being slidable coaxially with the control piston and cam means operated by the rotatable member being provided to cause the said oscillatory movement of the auxiliary piston.

11. A brake according to claim 10 wherein the cylinder is provided with a coaxial tube in which the valve is located, the auxiliary piston being annular in form and being slidable on the tube.

12. A disc brake according to claim 11 wherein the periphery of the disc is formed with a cam surface and a cam follower is mounted on the nonrotatable support so as to be engageable with the cam surface and with the auxiliary piston to effect oscillatory movement of the auxiliary piston as the disc rotates.

13. A disc brake according to claim 12 wherein the cam follower is arranged to be movable by the auxiliary piston into contact with the cam surface when the auxiliary piston moves towards the end of the cylinder adjacent the friction member.

14. A disc brake according to claim 13 wherein the cam follower is in the form of a bell crank lever pivoted on the nonrotatable support and having one end in engagement with the auxiliary piston and the other end engageable with the cam surface.

References Cited

UNITED STATES PATENTS

| | | |
|---|---|---|
| 2,736,395 | 2/1956 | Keeler. |
| 2,781,871 | 2/1957 | Alterkruse. |
| 2,868,338 | 1/1959 | Lucien et al. |
| 2,999,567 | 9/1961 | Adams. |

DUANE A. REGER, *Primary Examiner.*